United States Patent
Mizui et al.

(10) Patent No.: US 9,266,466 B2
(45) Date of Patent: *Feb. 23, 2016

(54) STOP LAMP LIGHTING CONTROL DEVICE FOR ELECTRIC VEHICLE

(71) Applicant: MITSUBISHI JIDOSHA KOGYO KABUSHIKI KAISHA, Tokyo (JP)

(72) Inventors: Toshifumi Mizui, Nagoya (JP); Toshiyuki Matsumi, Nagoya (JP); Hiroaki Miyamoto, Okazaki (JP); Hideaki Taniguchi, Okazaki (JP); Takanori Sugimoto, Tsushima (JP); Yasuyuki Hatsuda, Okazaki (JP); Akira Hashizaka, Okazaki (JP); Masato Nishida, Nagoya (JP); Sosuke Nanbu, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,807

(22) Filed: Dec. 24, 2014

(65) Prior Publication Data
US 2015/0175061 A1 Jun. 25, 2015

(30) Foreign Application Priority Data
Dec. 25, 2013 (JP) .................................. 2013-267205

(51) Int. Cl.
*B60Q 1/44* (2006.01)
*B60T 8/64* (2006.01)
*H02P 3/14* (2006.01)

(52) U.S. Cl.
CPC ... *B60Q 1/44* (2013.01); *H02P 3/14* (2013.01)

(58) Field of Classification Search
CPC ............ B60Q 1/44; B60Q 1/444; B60T 8/64; B60T 13/66; B60T 13/68; B60L 7/18; G06F 19/00; G08G 1/166
USPC ............ 315/76, 77, 79; 701/8, 70, 74, 84, 90; 303/121, 141, 152, 154
See application file for complete search history.

(56) References Cited

U.S. PATENT DOCUMENTS

| 6,208,929 B1 * | 3/2001 | Matsuno et al. ................. 701/89 |
| 6,246,944 B1 * | 6/2001 | Maruyama ....................... 701/70 |
| 2012/0100958 A1 * | 4/2012 | Oue et al. ........................ 477/21 |

FOREIGN PATENT DOCUMENTS

| DE | 102008055898 A1 | 5/2010 |
| EP | 2907698 A1 | 8/2015 |
| JP | 2012-153294 A | 8/2012 |
| WO | WO 2014/057911 A1 | 4/2014 |

* cited by examiner

*Primary Examiner* — Thai Pham
(74) *Attorney, Agent, or Firm* — Birch, Stewart, Kolasch & Birch, LLP

(57) ABSTRACT

A stop lamp lighting control device for an electric vehicle having an electric regenerative braking system, includes, a first calculation unit that converts a first deceleration threshold value to a first regenerative torque threshold value with a curb weight, a second calculation unit that converting a second deceleration threshold value to a second regenerative torque threshold value with a gross vehicle weight, a third calculation unit that calculates a third regenerative torque threshold value, and a determination unit that controls the stop lamp to be turned on when a regenerative torque value exceeds the first regenerative torque threshold value, the stop lamp to be turned off when the regenerative torque value is equal to or smaller than the second regenerative torque threshold value, and the stop lamp to be turned off when a given state continues.

5 Claims, 6 Drawing Sheets

STOP LAMP LIGHTING CONTROL DEVICE FOR ELECTRIC VEHICLE

CROSS REFERENCE TO RELATED APPLICATION

This application is based on Japanese Patent Application No. 2013-267205 filed on Dec. 25, 2013, the contents of which are incorporated herein by reference.

BACKGROUND

1. Technical Field

The present invention relates to a stop lamp lighting control device for an electric vehicle having an electric regenerative braking system, which controls stop lamps of the electrically-powered vehicle to be suitably turned on or off.

2. Related Art

In electric vehicles, such as electric vehicles, hybrid vehicles, or plug-in hybrid vehicles, an electromotor (motor) is used as a driving source. In such electric vehicles, one is known in which an electric regenerative braking system is provided as an assistant brake.

The electric regenerative braking system is configured so that when a driver stops operating an accelerator pedal and thus an accelerator opening degree becomes a fully closed state, circuit switching is performed so that the motor is rotated by a driving force of wheels and thus severs as a generator, thereby generating a braking force (e.g., see JP-A-2012-153294). As electric power generated by regenerative braking is charged to a battery According to the pre-revised regulation notified from the Ministry of Land, Infrastructure and Transport of Japan, when the electric regenerative braking system, which is adapted to be activated as an accelerator operation device is released, is being operated, turn-on of brake lamps and the like is prohibited even at any deceleration.

However, the regulation is revised so that turn-on of brake lamps and the like is obligated when a deceleration exceeds a predetermined specific value.

Relationships between decelerations and turn-on requirements are as follows:

(1) If the deceleration is $-0.7$ m/s$^2$ or less: turn-on prohibition (2) If the deceleration exceeds $-0.7$ m/s$^2$ and $-1.3$ m/s$^2$ or less: optionally turn-on (3) If the deceleration exceeds $-1.3$ m/s$^2$: obligatory turn-on The revised regulation is applied to automobiles which are newly subjected to designation of type or the like since Jan. 30, 2014.

FIG. 3 shows the revised regulation, in which a horizontal axis represents vehicle speeds and a vertical axis represents decelerations. In FIG. 3, a 'second deceleration threshold value for turning-off the stop lamp' corresponds to '$-0.7$ m/s$^2$' and a 'first deceleration threshold value for turning-on the stop lamp' corresponds to '$-1.3$ m/s$^2$'.

Herein, a minus sign '−' is assigned to values of decelerations, and when magnitudes of decelerations are compared, a deceleration having a higher absolute value is referred to as a higher deceleration. For example, a deceleration of 1.3 m/s$^2$ is referred to as a higher deceleration, as compared to a deceleration of $-0.7$ m/s$^2$.

Correspondingly, for regenerative torques as described below, a minus sign '−' is assigned to values of regenerative torques, and when magnitudes of regenerative torques are compared, a regenerative torque having a higher absolute value is referred to as a higher regenerative torque. For example, a regenerative torque of $-60$ Nm is referred to as a higher regenerative torque, as compared to a regenerative torque of $-20$ Nm.

However, turn-on or turn-off timings of the stop lamp greatly influence feelings of a driver of a succeeding vehicle, and also depending upon turn-on or turn-off timings, a driver of an associated vehicle is likely to be subject to an uncomfortable feeling. Accordingly, what is required is to perform suitable turn-on or turn-off control to conform to the revised regulation (see FIG. 3) while considering feelings of the drivers.

The present invention has been made keeping in mind the above problems, and an object thereof is to provide a stop lamp lighting control device for an electric vehicle, in which turn-on or turn off control of brake lamps (stop lamps) can be performed to alert a sufficient attention to a succeeding vehicle while not causing the succeeding vehicle to feel an inconvenience and also observing the revised regulation.

SUMMARY OF THE INVENTION (1) In order to solve the above matter, a stop lamp lighting control device for an electric vehicle having an electric regenerative braking system, includes, a first calculation unit that converts a previously-defined first deceleration threshold value for turning-on a stop lamp to a first regenerative torque threshold value for turning-on the stop lamp at each vehicle speed by calculation assumed that a weight of the electric vehicle is a curb weight, a second calculation unit that converting a previously-defined second deceleration threshold value for turning-off the stop lamp to a second regenerative torque threshold value for turning-off the stop lamp at each vehicle speed by calculation assumed that the weight of the electric vehicle is a gross vehicle weight, a third calculation unit that calculates, based on the first regenerative torque threshold value and the second regenerative torque threshold value converted, a third regenerative torque threshold value for turning-off the stop lamp which is smaller than the first regenerative torque threshold value and larger than the second regenerative torque threshold value, and a determination unit for controlling the stop lamp to be turned on when a regenerative torque value generated by the electric regenerative braking system during a regenerative braking exceeds the first regenerative torque threshold value corresponding to a vehicle speed at that time, the stop lamp to be turned off when the regenerative torque value is equal to or smaller than the second regenerative torque threshold value corresponding to a vehicle speed at that time, and the stop lamp to be turned off when a state where the regenerative torque value is equal to or smaller than the third regenerative torque threshold value corresponding to a vehicle speed at that time continues to exceed a predetermined specific period of time.

(2) In the stop lamp lighting control device for an electric vehicle according to (1), an absolute value of a difference between the first regenerative torque threshold value and the third regenerative torque threshold value is smaller than an absolute value of a difference between the second regenerative torque threshold value and the third regenerative torque threshold value.

(3) In the stop lamp lighting control device for an electric vehicle according to (1) or (2) the determination unit is configured to keep the stop lamp turned on when the regenerative torque value is changed to be equal to or smaller than the first regenerative torque threshold value while the stop lamp is at a turned on state and to keep the stop lamp turned off when the regenerative torque value is changed to exceed the second regenerative torque threshold value while the stop lamp is at a turned off state.

(4) In the stop lamp lighting control device for an electric vehicle according to any one of (1) to (3), the specific period of time is varied depending upon the vehicle speed.

(5) In the stop lamp lighting control device for an electric vehicle according to any one of (2) to (4), the absolute value of the difference between the first regenerative torque threshold value and the third regenerative torque threshold value is varied depending upon the vehicle speed.

According to the present invention, the first regenerative torque threshold value corresponding to the first deceleration threshold value for turning-on the stop lamp is calculated using the curb weight, the second regenerative torque threshold value corresponding to the second deceleration threshold value for turning-off the stop lamp is calculated using the gross vehicle weight, and also third regenerative torque threshold value is calculated to be smaller than the first regenerative torque threshold value and also larger than the second regenerative torque threshold value. Also, the stop lamp is turned on when the regenerative torque value exceeds the first regenerative torque threshold value, and the stop lamp is turned off when the regenerative torque value is equal to or smaller than the second regenerative torque threshold value. In addition, the stop lamp is turned off when a state where the regenerative torque value is equal to or smaller than the third regenerative torque threshold value continues to exceed the predetermined specific period of time.

Accordingly, turn-on or turn off control of the stop lamp can be performed to alert a sufficient attention to a succeeding vehicle while not causing the succeeding vehicle to feel an inconvenience and also observing the revised regulation.

DESCRIPTION OF PREFERRED EMBODIMENT

A stop lamp lighting control device for an electric vehicle according to the present invention will be now described in detail on the basis of embodiments.

In the following embodiments, although an electric vehicle having an electric regenerative braking system will be illustrated, the present invention can be also applied to a hybrid vehicle or a plug-in hybrid vehicle having such an electric regenerative braking system. A control principle will be first described and then specific embodiments employing the control principle will be described.

<Control Principle of Embodiment>

First, a control principle according to the present embodiment will be described.

Figure 3:
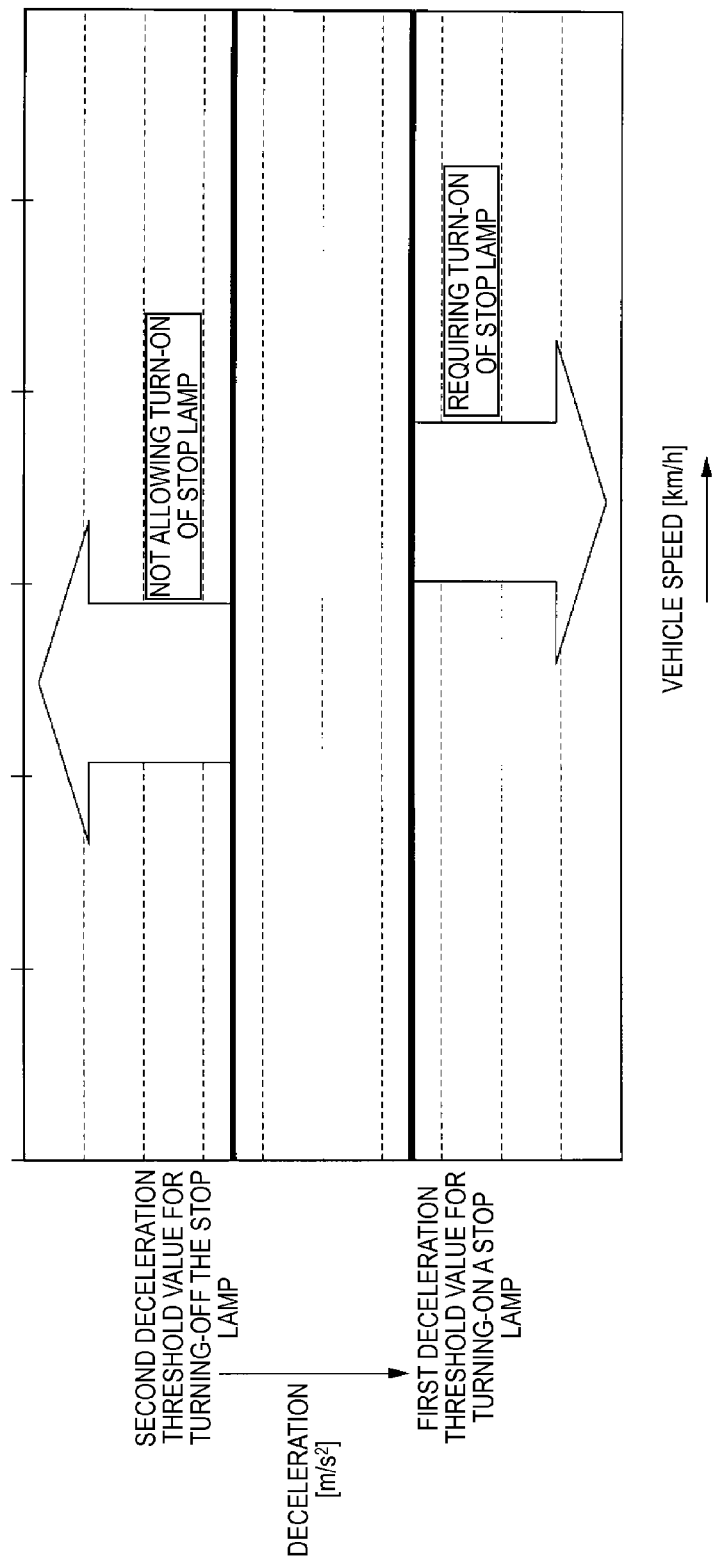
FIG. 3 is a characteristic diagram showing the notified regulation with a horizontal axis representing vehicle speeds and a vertical axis representing decelerations.

When attempting to control a stop lamp to be turned on or turned off based on a data map of FIG. 3 showing a revised regulation, regardless of vehicle speeds, the stop lamp is turned on if a deceleration exceeds $-1.3$ in/s$^2$, whereas the stop lamp is turned off if the deceleration is equal to or smaller than $-0.7$ m/s$^2$.

Herein, the deceleration of $-1.3$ m/s$^2$, which is a threshold value for turning on the stop lamp (threshold value defined by the regulation), is referred to as a 'first deceleration threshold value for turning-on the stop lamp', and the deceleration of $-0.7$ m/s$^2$, which is a threshold value for turning off the stop lamp (threshold value defined by the regulation), is referred to as a 'second deceleration threshold value for turning-off the stop lamp'.

In the present embodiment, a 'first regenerative torque threshold value for turning-on the stop lamp', which is a regenerative torque value corresponding to the 'first deceleration threshold value for turning-on the stop lamp' at each vehicle speed during running, is calculated and also a 'second regenerative torque threshold value for turning-off the stop lamp', which is a regenerative torque value corresponding to the 'second deceleration threshold value for turning-off the stop lamp' is calculated. In addition, on the basis of the first regenerative torque threshold value for turning-on the stop lamp and the second regenerative torque threshold value for turning-off the stop lamp obtained by calculation, a third regenerative torque threshold value for turning-off the stop lamp, which is smaller than the first regenerative torque threshold value for turning-on the stop lamp and larger than the second regenerative torque threshold value for turning-off the stop lamp, is calculated.

Further, a vehicle speed and a regenerative torque during running are obtained, and the stop lamp is controlled to be immediately turned on if the regenerative torque at the vehicle speed exceeds the first regenerative torque threshold value for turning-on the stop lamp at the vehicle speed, to be immediately turned off if the regenerative torque is equal to or smaller than the second regenerative torque threshold value for turning-off the stop lamp at the vehicle speed, and also to be turned off if a state where the regenerative torque is equal to or smaller than the third regenerative torque threshold value at the vehicle speed continues to exceed a predetermined specific period of time.

In other words, according to the embodiment, as a determination criterion for turn-on or turn-off control, regenerative torque values, instead of deceleration values, are employed to control the stop lamp to be turned on or off.

As well known, a deceleration caused by the electric regenerative braking system of the electric vehicle is determined by a regenerative torque, a vehicle speed, a running resistance coefficient, a vehicle weight, a gear ratio between a motor, which drives the electric vehicle, and drive wheels, and a wheel radius. Thus, if a deceleration, a vehicle speed, a running resistance coefficient, a vehicle weight, a gear ratio and a wheel radius are known, the regenerative torque can be determined. Namely, if $f$ is a certain function, the following relational expression can be established:

Regenerative torque=$f$(Deceleration, Vehicle speed, Running resistance coefficient, Vehicle weight, Gear ratio, Wheel radius)

From the above relational expression, the 'first regenerative torque threshold value for turning-on the stop lamp', which is a regenerative torque value corresponding to the 'first deceleration threshold value for turning-on the stop lamp', can be determined if the first deceleration threshold value for turning-on the stop lamp ($-1.3$ m/s$^2$) as a deceleration, a vehicle speed, a running resistance coefficient, a vehicle weight, a gear ratio and a wheel radius are known. In this way, the first deceleration threshold value for turning-on the stop lamp ($-1.3$ m/s$^2$) can be converted to the first regenerative torque threshold value for turning-on the stop lamp (Nm), which is a regenerative torque value at each vehicle speed.

Also, the 'second regenerative torque threshold value for turning-off the stop lamp', which is a regenerative torque value corresponding to the 'second deceleration threshold value for turning-off the stop lamp', can be determined if the second deceleration threshold value for turning-off the stop lamp ($-0.7$ m/s$^2$) as a deceleration, a vehicle speed, a running resistance coefficient, a vehicle weight, a gear ratio and a wheel radius are known. In this way, the second deceleration threshold value for turning-off the stop lamp ($-0.7$ m/s$^2$) can be converted to the second regenerative torque threshold value for turning-off the stop lamp (Nm), which is a regenerative torque value at each vehicle speed.

The third regenerative torque threshold value (Nm) is calculated on the basis of the first regenerative torque threshold value for turning-on the stop lamp (Nm) and the second regenerative torque threshold value for turning-off the stop lamp (Nm) calculated by conversion as described above.

As each data (running resistance coefficient and the like) used for converting the 'first deceleration threshold value for turning-on the stop lamp' and the 'second deceleration threshold value for turning-off the stop lamp' to the 'first regenerative torque threshold value for turning-on the stop lamp' and the 'second regenerative torque threshold value for turning-off the stop lamp', the employed data are as follows:

Deceleration . . . the first deceleration threshold value for turning-on the stop lamp ($-1.3$ m/s$^2$) or the second deceleration threshold value for turning-off the stop lamp ($-0.7$ m/s$^2$).

Vehicle speed . . . a value calculated by a vehicle speed calculation unit 8 based on a wheel speed signal S2 obtained from a wheel speed sensor 7.

Running resistance coefficient . . . a value previously measured by a test.

Vehicle weight . . . a curb weight (CW) or a gross vehicle weight (GVW) defined by specifications.

Gear ratio . . . a value defined by specifications.

Wheel radius . . . a value defined by specifications.

Herein, the vehicle weight employs the curb weight, which corresponds to a minimum weight, and the gross vehicle weight, which corresponds to a maximum weight, considering variations thereof due to passengers or burdens.

Figure 4:
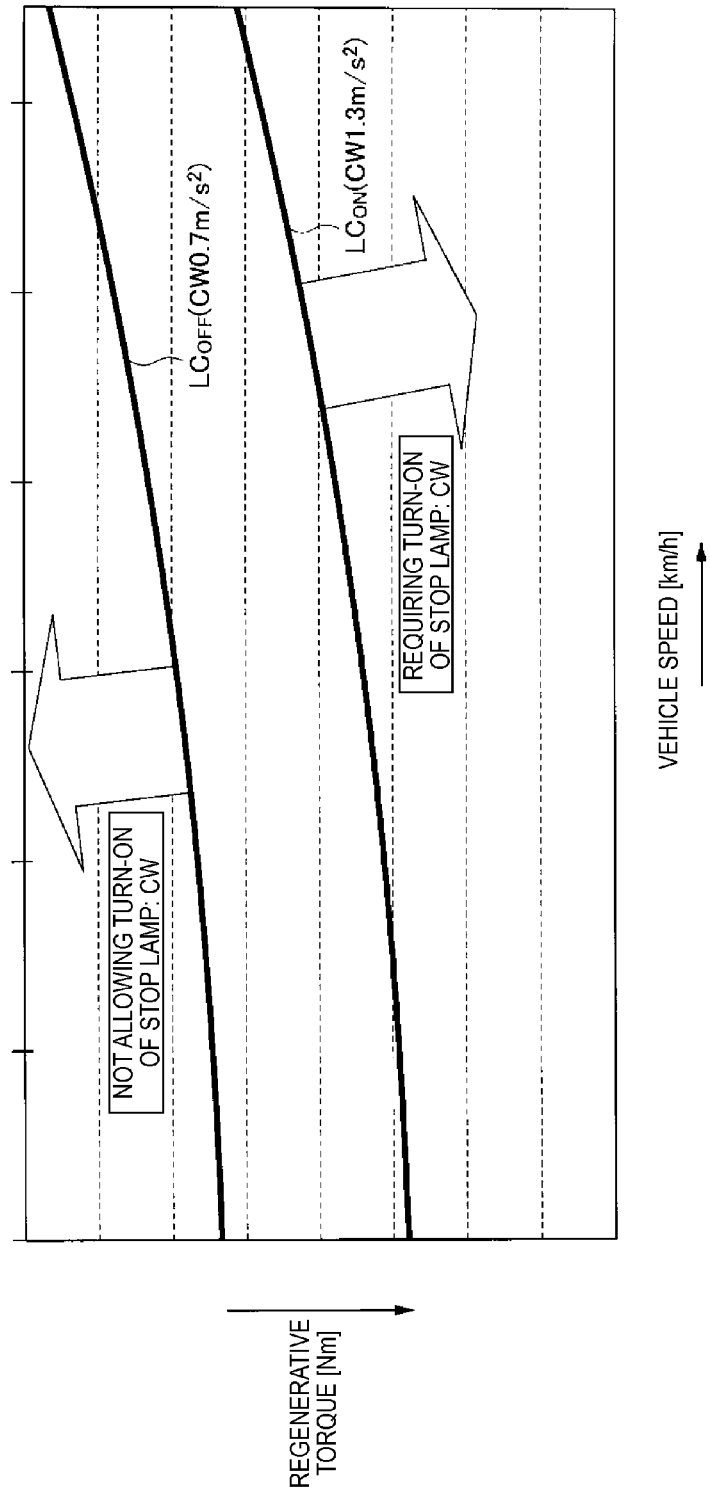
FIG. 4 is a characteristic diagram with a horizontal axis representing vehicle speeds and a vertical axis representing regenerative torques obtained by converting the regulation with the horizontal axis representing vehicle speeds and the vertical axis representing decelerations, using an empty vehicle weight.

FIG. 4 shows a data map in which the 'first deceleration threshold value for turning-on the stop lamp' and the 'second deceleration threshold value for turning-off the stop lamp' are converted to the 'first regenerative torque threshold value for turning-on the stop lamp' and the 'second regenerative torque threshold value for turning-off the stop lamp', using the curb weight (CW) as the vehicle weight and also considering vehicle speeds, the running resistance coefficient, the gear ratio and the wheel radius.

A stop lamp turn-on regenerative torque threshold value line $LC_{ON}$ shown in FIG. 4 is a line obtained by converting the first deceleration threshold value for turning-on the stop lamp ($-1.3$ m/s$^2$) to the first regenerative torque threshold value for turning-on the stop lamp (Nm) at each vehicle speed and then by continuously connecting the first regenerative torque threshold values for turning-on the stop lamp (Nm). Also, a first stop lamp turn-off regenerative torque threshold value line $LC_{OFf}$ shown in FIG. 4 is a line obtained by converting the second deceleration threshold value for turning-off the stop lamp ($-0.7$ m/s$^2$) to the second regenerative torque threshold value for turning-off the stop lamp (Nm) at each vehicle speed and then by continuously connecting the second regenerative torque threshold values for turning-off the stop lamp (Nm).

The stop lamp turn-on regenerative torque threshold value line $LC_{ON}$ and the first stop lamp turn-off regenerative torque threshold value line $LC_{OFF}$ are gradually decreased as the vehicle speed are increased. This reason is in that a running resistance determined from the vehicle speed and the running resistance coefficient is increased as the vehicle speed is increased.

Figure 5:
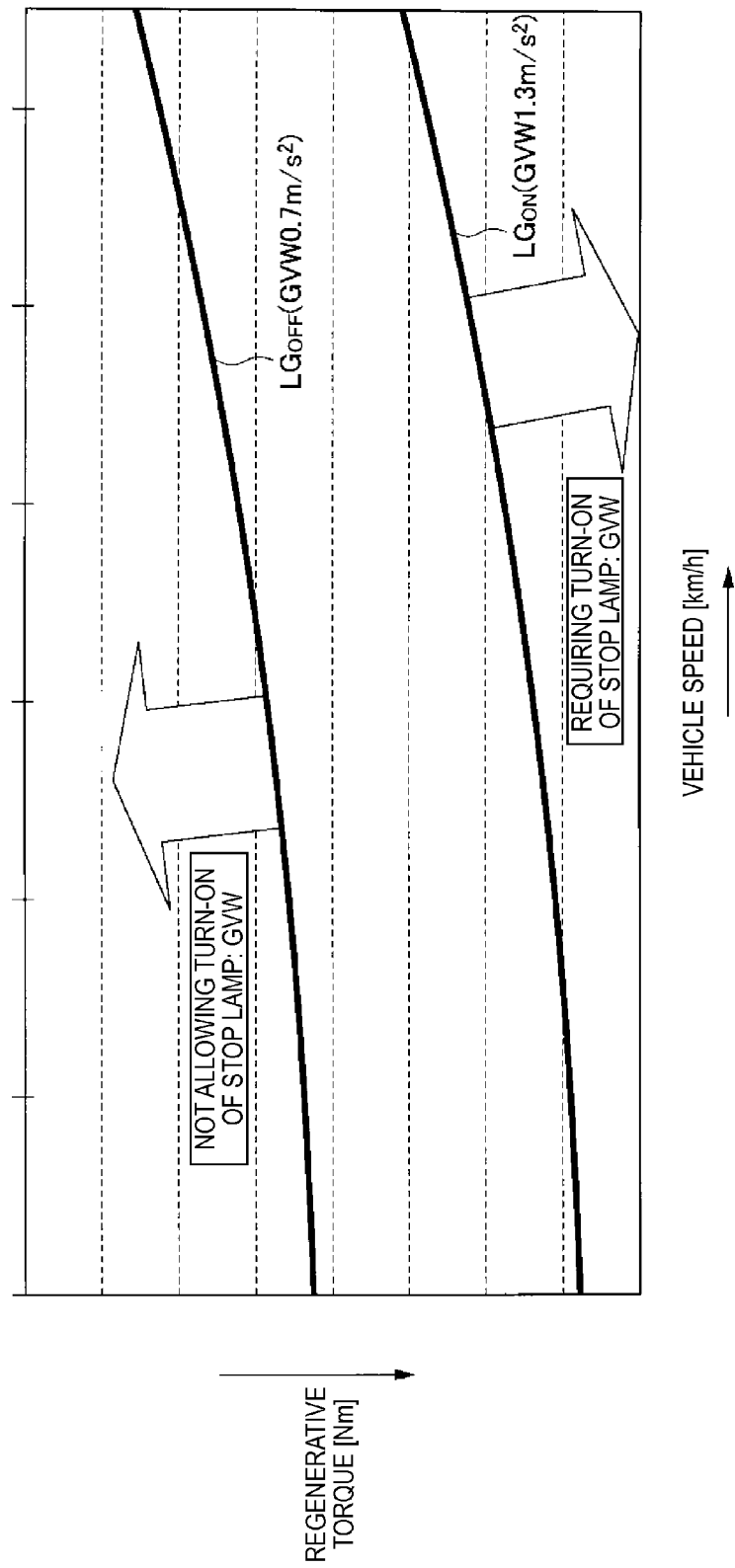
FIG. 5 is a characteristic diagram with a horizontal axis representing vehicle speeds and a vertical axis representing regenerative torques obtained by converting the regulation with the horizontal axis representing vehicle speeds and the vertical axis representing decelerations, using a total vehicle weight.

FIG. 5 shows a data map in which the 'first deceleration threshold value for turning-on the stop lamp' and the 'second deceleration threshold value for turning-off the stop lamp' are converted to the 'first regenerative torque threshold value for turning-on the stop lamp' and the 'second regenerative torque threshold value for turning-off the stop lamp', using the gross vehicle weight (GVW) as the vehicle weight and also considering vehicle speeds, the running resistance coefficient, the gear ratio and the wheel radius.

A first regenerative torque threshold value for turning-on the stop lamp line $LG_{ON}$ shown in FIG. 5 is a line obtained by converting the first deceleration threshold value for turning-on the stop lamp ($-1.3$ m/s$^2$) to the first regenerative torque threshold value for turning-on the stop lamp (Nm) at each vehicle speed and then by continuously connecting the first regenerative torque threshold values for turning-on the stop lamp (Nm). Also, a first stop lamp turn-off regenerative torque threshold value line $LG_{OFf}$ shown in FIG. 5 is a line obtained by converting the second deceleration threshold value for turning-off the stop lamp ($-0.7$ m/s$^2$) to the second regenerative torque threshold value for turning-off the stop lamp (Nm) at each vehicle speed and then by continuously connecting the second regenerative torque threshold values for turning-off the stop lamp (Nm).

The stop lamp turn-on regenerative torque threshold value line $LG_{ON}$ and the first stop lamp turn-off regenerative torque threshold value line $LG_{OFF}$ are gradually decreased as the vehicle speed are increased. This reason is in that a running resistance determined from the vehicle speed and the running resistance coefficient is increased as the vehicle speed is increased.

Meanwhile, when the vehicle speed is v, the running resistance coefficients are a and b, and the running resistance is R, the running resistance R is calculated by the following equation:

$$R = a \times v^2 + b$$

Figure 6:
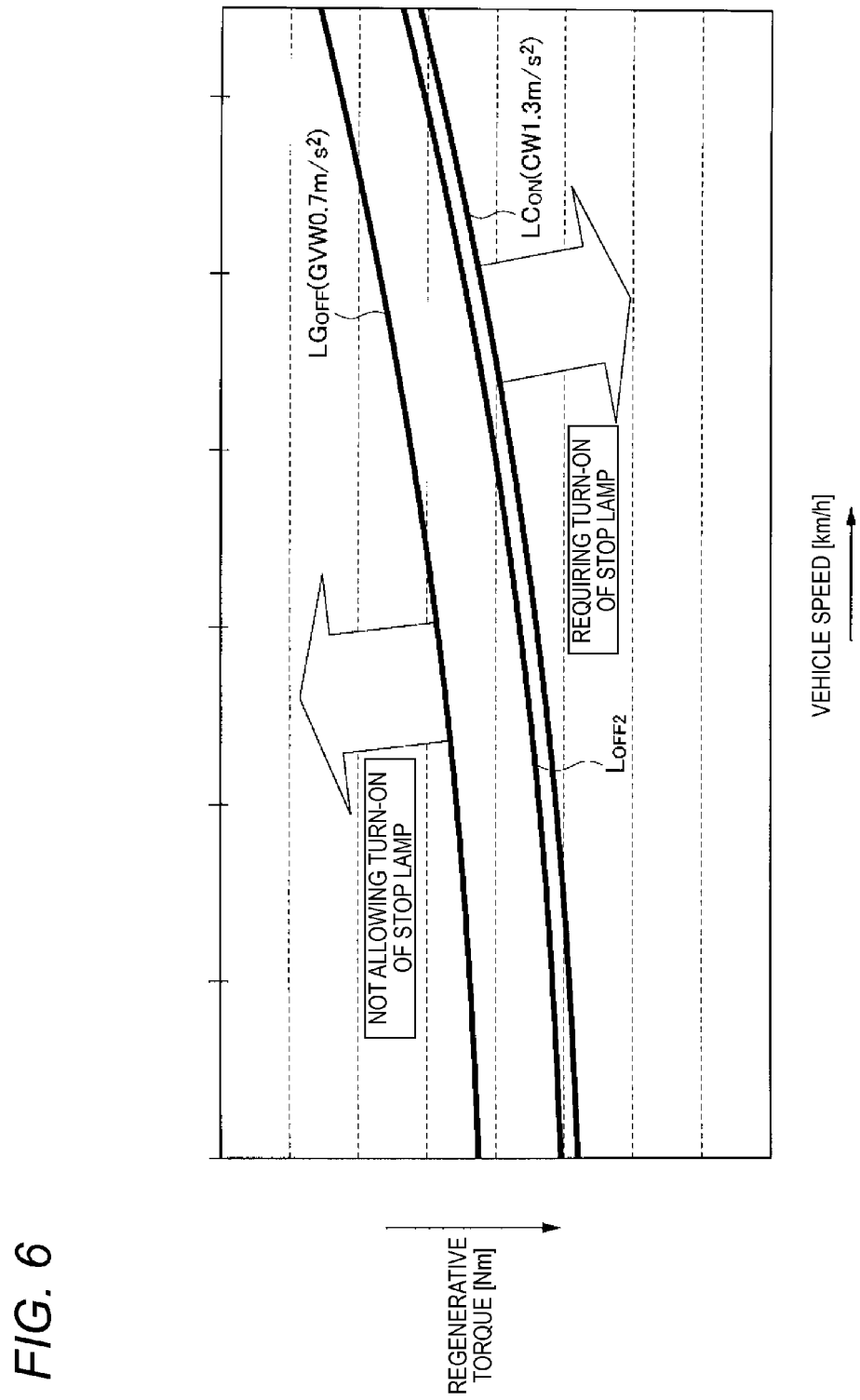
FIG. 6 is a characteristic diagram with a horizontal axis representing vehicle speeds and a vertical axis representing regenerative torques, corresponding to a data map used in the embodiment of the invention and also set to be capable of observing the notified regulation, regardless of a vehicle weight.

According to the present embodiment, as shown in FIG. 6, the stop lamp turn-on regenerative torque threshold value line $LC_{ON}$ converted using the curb weight (CW) is employed as a stop lamp turn-on regenerative torque threshold value line, and the first stop lamp turn-off regenerative torque threshold value line $LG_{OFF}$ converted using the gross vehicle weight (GVW) is employed as a first stop lamp turn-off regenerative torque threshold value line.

Further, according to the embodiment, a second stop lamp turn-off regenerative torque threshold value line $L_{OFF2}$ is set to be smaller than the stop lamp turn-on regenerative torque threshold value line $LC_{ON}$ and also larger than the first stop lamp turn-off regenerative torque threshold value line $LG_{OFF}$.

Namely, in the present embodiment, the stop lamp is controlled to be turn on or turn off using the stop lamp turn-on regenerative torque threshold value line $LC_{ON}$, the first stop lamp turn-off regenerative torque threshold value line $LG_{OFF}$ and the second stop lamp turn-off regenerative torque threshold value line $L_{OFF2}$ shown in FIG. 6.

Meanwhile, the second stop lamp turn-off regenerative torque threshold value line $L_{OFF2}$ is set so that an absolute value of a difference between the stop lamp turn-on regenerative torque threshold value line $LC_{ON}$ and the second stop lamp turn-off regenerative torque threshold value line $L_{OFF2}$, is smaller than an absolute value of a difference between the first stop lamp turn-off regenerative torque threshold value line $LG_{OFF}$ and the second stop lamp turn-off regenerative torque threshold value line $L_{OFF2}$.

Giving to attention to two stop lamp turn-on regenerative torque threshold value lines shown in FIGS. 4 and 5, the stop lamp turn-on regenerative torque threshold value line $LC_{ON}$ is smaller than the stop lamp turn-on regenerative torque threshold value line $LG_{ON}$ and therefore, the smaller stop lamp turn-on regenerative torque threshold value line $LC_{ON}$ is employed in FIG. 6.

According to the present embodiment, when a regenerative torque exceeds the stop lamp turn-on regenerative torque threshold value line $LC_{ON}$, the stop lamp is controlled to be immediately turned on. By doing so, even when the vehicle weight is the gross vehicle weight (GVW) as well as the curb weight (CW), namely, even when the vehicle weight is any vehicle weight falling in a range from the curb weight (CW) to the gross vehicle weight (GVW), the stop lamp can be appropriately turned on while observing the regulation.

Giving to attention to two first stop lamp turn-off regenerative torque threshold value lines shown in FIGS. 4 and 5, the first stop lamp turn-off regenerative torque threshold value line $LG_{OFF}$ is larger than the first stop lamp turn-off regenerative torque threshold value line $LC_{OFF}$ and therefore, the larger first stop lamp turn-off regenerative torque threshold value line $LG_{OFF}$ is employed in FIG. 6.

According to the present embodiment, when a regenerative torque is equal to or smaller than the first stop lamp turn-off regenerative torque threshold value line $LG_{OFF}$, the stop lamp is controlled to be immediately turned off. By doing so, even when the vehicle weight is the curb weight (CW) as well as the gross vehicle weight (GVW), namely, even when the vehicle weight is any vehicle weight falling in a range from the gross vehicle weight (GVW) to the curb weight (CW), the stop lamp can be appropriately turned off while observing the regulation.

On the other hand, in tune-off control of the present embodiment using the second stop lamp turn-off regenerative torque threshold value line $L_{OFF2}$, when a state where a regenerative torque is equal to or smaller than the second threshold value line $L_{OFF2}$ continues to exceed a predetermined specific period of time, the stop lamp is controlled to be turned off By performing turn-off control in this way, if after the stop lamp is turned on, the vehicle becomes an inertia running state (coasting, i.e., a state where the vehicle is run by an inertia while an accelerator opening degree is a fully closed state) so that the electric regenerative braking system is activated, it is possible to avoid the stop lamp from being kept turned on endlessly and thus to prevent a succeeding vehicle from feeling an inconvenience.

<Specific Embodiments Employing the Control Principle>

Now, specific embodiments employing the control principle as described above will be described with reference to FIG. 1.

Figure 1:
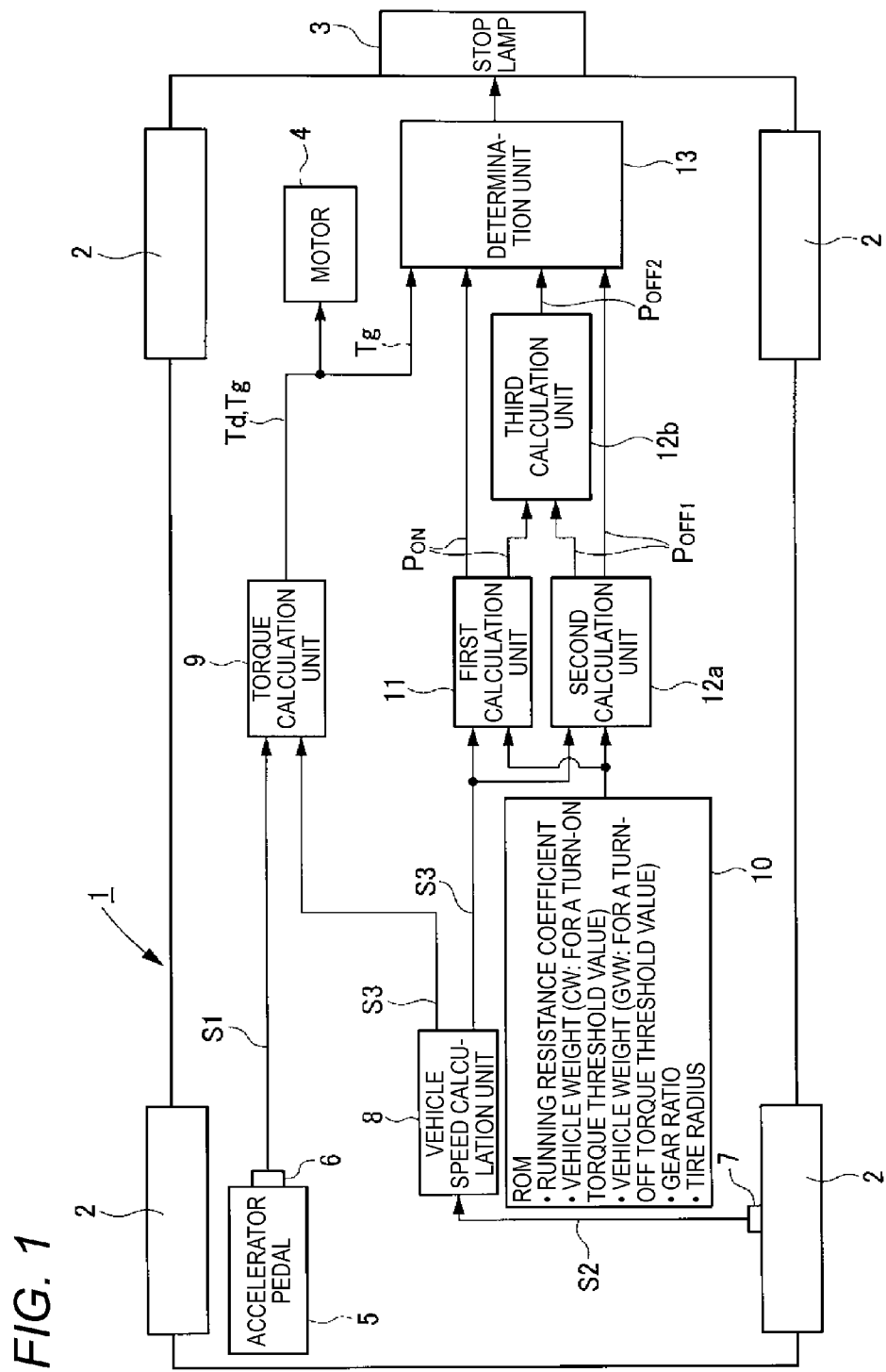
FIG. 1 is a block diagram showing a stop lamp lighting control device for an electric vehicle according to an embodiment of the present invention.

FIG. 1 shows an electric vehicle 1 in which the stop lamp lighting control device for the electric vehicle according to the present embodiment is mounted. The electric vehicle 1 has wheels 2, a stop lamp 3 and a driving motor 4.

An accelerator position sensor 6 is disposed on an accelerator pedal 5 and the accelerator position sensor 6 outputs an accelerator opening degree signal S1 representing an accelerator opening degree. A wheel speed sensor 7 is disposed on the wheel 2 and the wheel speed sensor 7 outputs a wheel speed signal S3 representing a wheel speed. A vehicle speed calculation unit 8 outputs a vehicle speed signal S3 representing a vehicle speed based on the wheel speed signal S2.

On the bases of the accelerator opening degree signal S1, the vehicle speed signal S3, or information, such as a shifting position signal from a shifting position sensor for detecting a shifting position of a shifting lever, not shown, a torque calculation unit (EV-ECU: vehicle integration unit) 9 outputs a required torque signal Td representing a required torque when the electric vehicle 1 is driven to run, and also outputs a regenerative torque signal Tg representing a regenerative torque during regenerative braking.

When the torque calculation unit 9 outputs the regenerative torque signal Tg, the accelerator opening degree represented by the accelerator opening degree signal S1 become a fully closed state, and the torque calculation unit 9 performs control for circuit switching required to perform regenerative braking.

When receiving the required torque signal Td, the motor 4 is operated to generate the required torque represented by the required torque signal Td, and a driving force of the motor 4 is transmitted to the wheels 2 via a transmission mechanism, such as gears. Thus, the electric vehicle 1 is driven to run.

If receiving the regenerative torque signal Tg, the motor 4 performs power generation braking to generate the regenerative torque represented by the regenerative torque signal Tg and exerts a braking force on the wheels 2. The regenerative torque generated from the motor 4 as the accelerator is fully closed is set to correspond to an engine brake of a gasoline engine and therefore is basically decreased as the vehicle speed is decreased.

A system configuration in which the torque calculation unit 9 outputs the regenerative torque signal Tg and thus the motor 4 performs regenerative braking corresponds to the 'electric regenerative braking system'.

In a memory unit (ROM) 10, the following predetermined data values are stored.

Running resistance coefficient (a value previously measured by a test)
   Curb weight (CW defined by specifications)
   Gross vehicle weight (GVW defined by specifications)
   Gear ratio (a value defined by specifications)
   Wheel radius (a value defined by specifications)

In a first calculation unit 11, the first deceleration threshold value for turning-on the stop lamp ($-1.3$ m/s$^2$) is previously set. The first calculation unit 11 calculates and outputs, at every predetermined specific clocks, a first regenerative torque threshold value for turning-on the stop lamp $P_{ON}$ at a vehicle speed represented by the vehicle speed signal S3 at each clock, using the first deceleration threshold value for turning-on the stop lamp (−1.3 m/s$^2$), the vehicle speed represented by the vehicle speed signal S3, and the running resistance coefficient, the curb weight (CW), the gear ratio and the wheel radius stored in the memory unit 10. The first regenerative torque threshold value for turning-on the stop lamp P$_{ON}$ calculated in this way is a value on the stop lamp turn-on regenerative torque threshold value line LC$_{ON}$ shown in FIG. 6 and represents a regenerative torque value (vertical axis in FIG. 6) required to generate a certain deceleration as a function of a vehicle speed (horizontal axis in FIG. 6) at a time of calculation.

In a second calculation unit 12a, the second deceleration threshold value for turning-off the stop lamp (−0.7 m/s$^2$) is previously set. The second calculation unit 12a calculates and outputs, at every predetermined specific clocks, a second regenerative torque threshold value for turning-off the stop lamp P$_{OFF1}$ at a vehicle speed represented by the vehicle speed signal S3 at each clock, using the second deceleration threshold value for turning-off the stop lamp (−0.7 m/s$^2$), the vehicle speed represented by the vehicle speed signal S3, and the running resistance coefficient, the gross vehicle weight (GVW), the gear ratio and the wheel radius stored in the memory unit 10.

The second regenerative torque threshold value for turning-off the stop lamp P$_{OFF1}$ calculated in this way is a value on the first stop lamp turn-off regenerative torque threshold value line LG$_{OFF}$ shown in FIG. 6 and represents a regenerative torque value (vertical axis in FIG. 6) required to generate a certain deceleration as a function of a vehicle speed (horizontal axis in FIG. 6) at a time of calculation.

To a third calculation unit 12b, at every predetermined specific clocks, the first regenerative torque threshold value for turning-on the stop lamp P$_{ON}$ from the first calculation unit 11 is inputted and also the second regenerative torque threshold value for turning-off the stop lamp P$_{OFF1}$ from the second calculation unit 12a is inputted. On the basis of the first regenerative torque threshold value for turning-on the stop lamp P$_{ON}$ and the second regenerative torque threshold value for turning-off the stop lamp P$_{OFF1}$ inputted, at every predetermined specific clocks, the third calculation unit 12b calculates a third regenerative torque threshold value for turning-off the stop lamp P$_{OFF2}$ which is smaller than the first regenerative torque threshold value for turning-on the stop lamp P$_{ON}$ and also larger than the second regenerative torque threshold value for turning-off the stop lamp P$_{OFF1}$. In this case, the calculation is performed so that an absolute value of a difference between the first regenerative torque threshold value for turning-on the stop lamp P$_{ON}$ and the third regenerative torque threshold value for turning-off the stop lamp P$_{OFF2}$ is smaller than an absolute value of a difference between the second regenerative torque threshold value for turning-off the stop lamp P$_{OFF1}$ and the third regenerative torque threshold value for turning-off the stop lamp P$_{OFF2}$ (e.g., calculation using a calculation function).

A determination unit 13 receives, at every predetermined specific clocks, the regenerative torque signal Tg outputted from the torque calculation unit 9 and also receives, at every predetermined specific clocks, the first regenerative torque threshold value for turning-on the stop lamp P$_{ON}$ outputted from the first calculation unit 11, the second regenerative torque threshold value for turning-off the stop lamp P$_{OFF1}$ outputted from the second calculation unit 12a and the third regenerative torque threshold value for turning-off the stop lamp P$_{OFF2}$ outputted from the third calculation unit 12b. Thus, the determination unit 13 performs, at every predetermined specific clocks, comparison determination between a regenerative torque value represented by the regenerative torque signal Tg and the first regenerative torque threshold value for turning-on the stop lamp P$_{ON}$, the second regenerative torque threshold value for turning-off the stop lamp P$_{OFF1}$ and third regenerative torque threshold value for turning-off the stop lamp P$_{OFF2}$ received thereto. Also, in the determination unit 13, a predetermined 'specific period of time' is set.

Meanwhile, the specific clocks in the determination unit 13 is synchronized with the specific clocks in the first calculation unit 11, the specific clocks in the second calculation unit 12a and the specific clocks in the third calculation unit 12b.

The determination unit 13 performs control for immediately turning on the stop lamp 3 when the regenerative torque value represented by the regenerative torque signal Tg exceeds the first regenerative torque threshold value for turning-on the stop lamp P$_{ON}$.

Also, the determination unit 13 performs control for immediately turning off the stop lamp 3 when the regenerative torque value represented by the regenerative torque signal Tg is equal to or smaller than the second regenerative torque threshold value for turning-off the stop lamp P$_{OFF}$. This turn-off control is referred to as a 'first turn-off control'.

Further, the determination unit 13 performs control for turning off the stop lamp 3 when a state where the regenerative torque value represented by the regenerative torque signal Tg is equal to or smaller than the third regenerative torque threshold value for turning-off the stop lamp P$_{OFF2}$ continues to exceed the predetermined specific period of time. This turn-off control is referred to as a 'second turn-off control'.

In addition, when the regenerative torque value represented by the regenerative torque signal Tg is changed in such a manner that the regenerative torque value represented by the regenerative torque signal Tg exceeds the first regenerative torque threshold value for turning-on the stop lamp P$_{ON}$ to turn on the stop lamp 3 and then is again decreased to be equal to or smaller than the first regenerative torque threshold value for turning-on the stop lamp P$_{ON}$, the determination unit 13 keeps the stop lamp 3 turned on.

Also, in a state where the regenerative torque value represented by the regenerative torque signal Tg exceeds the first regenerative torque threshold value for turning-on the stop lamp P$_{ON}$ and thus the stop lamp 3 is turned on, when the regenerative torque value represented by the regenerative torque signal Tg is changed in such a manner that the regenerative torque value represented by the regenerative torque signal Tg becomes equal to or smaller than the second regenerative torque threshold value for turning-off the stop lamp P$_{OFF1}$ to turn off the stop lamp 3 and then is again increased to exceed the second regenerative torque threshold value for turning-off the stop lamp P$_{OFF1}$, the determination unit 13 keep the stop lamp 3 turned off.

Here, specific driving situations in which the 'first turn-off control' and the 'second turn-off control' are performed will be described with reference to the FIG. 6.

(1) An Example of a Driving Situation in which The First Turn-Off Control is Performed After a regenerative torque value exceeds to the stop lamp turn-on regenerative torque threshold value line LC$_{ON}$ to turn on the stop lamp, when a driver steps the accelerator pedal to accelerate the electric vehicle 1, the regenerative torque value becomes equal to or smaller than first stop lamp turn-off regenerative torque threshold value line LG$_{OFF}$ in a short time.

In this case, according to the first turn-off control, at a time when the regenerative torque value becomes equal to or smaller than first stop lamp turn-off regenerative torque threshold value line $LG_{OFF}$, the stop lamp 3 can be immediately turned off. In this driving situation, the stop lamp 3 can be turned off depending upon acceleration intention of the driver, thereby allowing turn-off control to be performed while observing the regulation.

(2) An Example of a Driving Situation in which the Second Turn-Off Control is Performed After the regenerative torque value exceeds the stop lamp turn-on regenerative torque threshold value line $LC_{ON}$ to turn on the stop lamp, when the regenerative torque value is decreased to be equal to or smaller than the stop lamp turn-on regenerative torque threshold value line $LC_{ON}$, the regenerative torque value rarely becomes equal to or smaller than the first stop lamp turn-off regenerative torque threshold value line $LG_{OFF}$ if the driver allows the electric vehicle 1 to coast while not stepping the accelerator pedal.

In this state, if the second turn-off control is not performed, the stop lamp 3 is kept turned on for a long time, and thus, there is a possibility that a driver of a succeeding vehicle feels an inconvenience.

Therefore, the second turn-off control is performed so that when a state where the regenerative torque value is equal to or smaller than the second stop lamp turn-off regenerative torque threshold value line $L_{OFF2}$ continues to exceed the predetermined specific period of time, the stop lamp 3 is turned off. As a result, the succeeding vehicle can be prevented from feeling an inconvenience, and also turn-off control can be performed while observing the regulation.

Also, because the third regenerative torque threshold value for turning-off the stop lamp $P_{OFF2}$ is calculated so that an absolute value of a difference between the first regenerative torque threshold value for turning-on the stop lamp $P_{ON}$ and the third regenerative torque threshold value for turning-off the stop lamp $P_{OFF2}$ is smaller than an absolute value of a difference between the second regenerative torque threshold value for turning-off the stop lamp $P_{OFF1}$ and the third regenerative torque threshold value for turning-off the stop lamp $P_{OFF2}$, the second turn-off control can be performed at an earlier timing after the stop lamp 3 is turned on, thereby further reducing an inconvenience felt by the succeeding vehicle.

In this way, by performing such calculation controls at every predetermined specific clocks, regardless of the vehicle weight and also even at any vehicle speeds, the determination unit 13 causes the stop lamp 3 to be immediately turned on when the regenerative torque value represented by the regenerative torque signal Tg exceeds the stop lamp turn-on regenerative torque threshold value line $LC_{ON}$ shown in FIG. 6, the stop lamp 3 to be immediately turned off when the regenerative torque value represented by the regenerative torque signal Tg is equal to or smaller than the first stop lamp turn-off regenerative torque threshold value line $LG_{OFF}$ shown in FIG. 6, and also the stop lamp 3 to be turned off when a state where the regenerative torque value represented by the regenerative torque signal Tg is equal to or smaller than the second stop lamp turn-off regenerative torque threshold value line $LG_{OFF2}$ shown in FIG. 6 continues to exceed the predetermined specific period of time.

A system configuration in which the vehicle speed calculation unit 8, the torque calculation unit 9, the memory unit 10, the first calculation unit 11, the second calculation unit 12a, the third calculation unit 12b and the determination unit 13 as described above are cooperated to perform comparison determination between the regenerative torque value represented by the regenerative torque signal Tg and the first regenerative torque threshold value for turning-on the stop lamp $P_{ON}$, the second regenerative torque threshold value for turning-off the stop lamp $P_{OFF1}$ and the third regenerative torque threshold value for turning-off the stop lamp $P_{OFF2}$ as described above, and according to the results of comparison determination, the stop lamp 3 is controlled to be turned on or off, corresponds to the 'stop lamp lighting control device for the electric vehicle'.

Meanwhile, for the second turn-off control, the absolute value of the difference between the first regenerative torque threshold value for turning-on the stop lamp $P_{ON}$ and the third regenerative torque threshold value for turning-off the stop lamp $P_{OFF2}$ (the absolute value of the difference between the stop lamp turn-on regenerative torque threshold value line $LC_{ON}$ and the second stop lamp turn-off regenerative torque threshold value line $L_{OFF2}$ shown in FIG. 6) and the predetermined specific period of time are appropriately set, considering states of turn-on or turn-off control during computer simulation or test running. Thus, occurrence of chattering phenomenon in which turn-on/turn-off of the stop lamp 3 is unnecessarily repeated due to an effect of disturbance is inhibited.

Further, the predetermined 'specific period of time' in the second turn-off control may be varied depending upon the vehicle speed.

For example, as the vehicle speed is increased, the regenerative torque generated upon deceleration of the electric vehicle 1 is increased and also the duration of generation thereof becomes longer. Therefore, as the vehicle speed is increased, the regenerative torque value tends to continue to exceed the first regenerative torque threshold value for turning-on the stop lamp $P_{ON}$ for such a long time. In other words, the duration during which the stop lamp 3 is kept turned on becomes longer to increase a possibility of feeing an inconvenience at a succeeding vehicle. In order to reduce such a possibility, the 'specific period of time' passed after the regenerative torque value becomes smaller than the third regenerative torque threshold value for turning-off the stop lamp $P_{OFF2}$, which is a criterion for determining turn-off, may be set to become shorter as the vehicle speed is increased.

Accordingly, as the vehicle speed is increased, the stop lamp 3 tends to be difficult to be kept turned on, and thus alerting attention to the succeeding vehicle can be encouraged while the succeeding vehicle is not caused to feel an inconvenience due to turn-on of the stop lamp 3, as far as a user is not uncomfortable in a higher speed region.

Also, the absolute value of the difference between the first regenerative torque threshold value for turning-on the stop lamp $P_{ON}$ and the third regenerative torque threshold value for turning-off the stop lamp $P_{OFF2}$ may be varied depending upon the vehicle speed.

As described above, the duration during which the stop lamp 3 is kept turned on becomes longer as the vehicle speed is increased, thereby increasing a possibility of feeing an inconvenience at a succeeding vehicle. Accordingly, in order to reduce such a possibility, for example, the absolute value of the difference between the first regenerative torque threshold value for turning-on the stop lamp $P_{ON}$ and the third regenerative torque threshold value for turning-off the stop lamp $P_{OFF2}$ may be set to become smaller as the vehicle speed is increased. Specifically, the third regenerative torque threshold value for turning-off the stop lamp $P_{OFF2}$ may be set to be nearer to the first regenerative torque threshold value for turning-on the stop lamp $P_{ON}$ as the vehicle speed is increased.

Accordingly, as the vehicle speed is increased, the second turn-off control can be performed at an earlier timing after the stop lamp 3 is turned on, so that the stop lamp 3 tends to be difficult to be kept turned on and thus alerting attention to the succeeding vehicle can be encouraged while the succeeding vehicle is not caused to feel an inconvenience due to turn-on of the stop lamp 3, as far as a user is not uncomfortable in a higher speed region.

Also, setting the 'specific period of time' passed after the regenerative torque value becomes smaller than the third regenerative torque threshold value for turning-off the stop lamp $P_{OFF2}$, which is the criterion for determining turn-off, to become shorter as the vehicle speed is increased and setting the third regenerative torque threshold value for turning-off the stop lamp $P_{OFF2}$ to be nearer to the first regenerative torque threshold value for turning-on the stop lamp $P_{ON}$ as the vehicle speed is increased may be controlled to be simultaneously performed.

Therefore, as the vehicle speed is increased, the stop lamp 3 tends to be more difficult to be kept turned on, and thus an inconvenience felt by the succeeding vehicle due to turn-on of the stop lamp 3 in a higher speed region can be further reduced.

In this way, by varying the 'specific period of time' passed after the regenerative torque value becomes smaller than the third regenerative torque threshold value for turning-off the stop lamp $P_{OFF2}$, which is the criterion for determining turn-off, depending upon the vehicle speed, or by varying the absolute value of the difference between the first regenerative torque threshold value for turning-on the stop lamp $P_{ON}$ and the third regenerative torque threshold value for turning-off the stop lamp $P_{OFF2}$ depending upon the vehicle speed, lighting control can be performed according to the needs of the driver.

Figure 2:
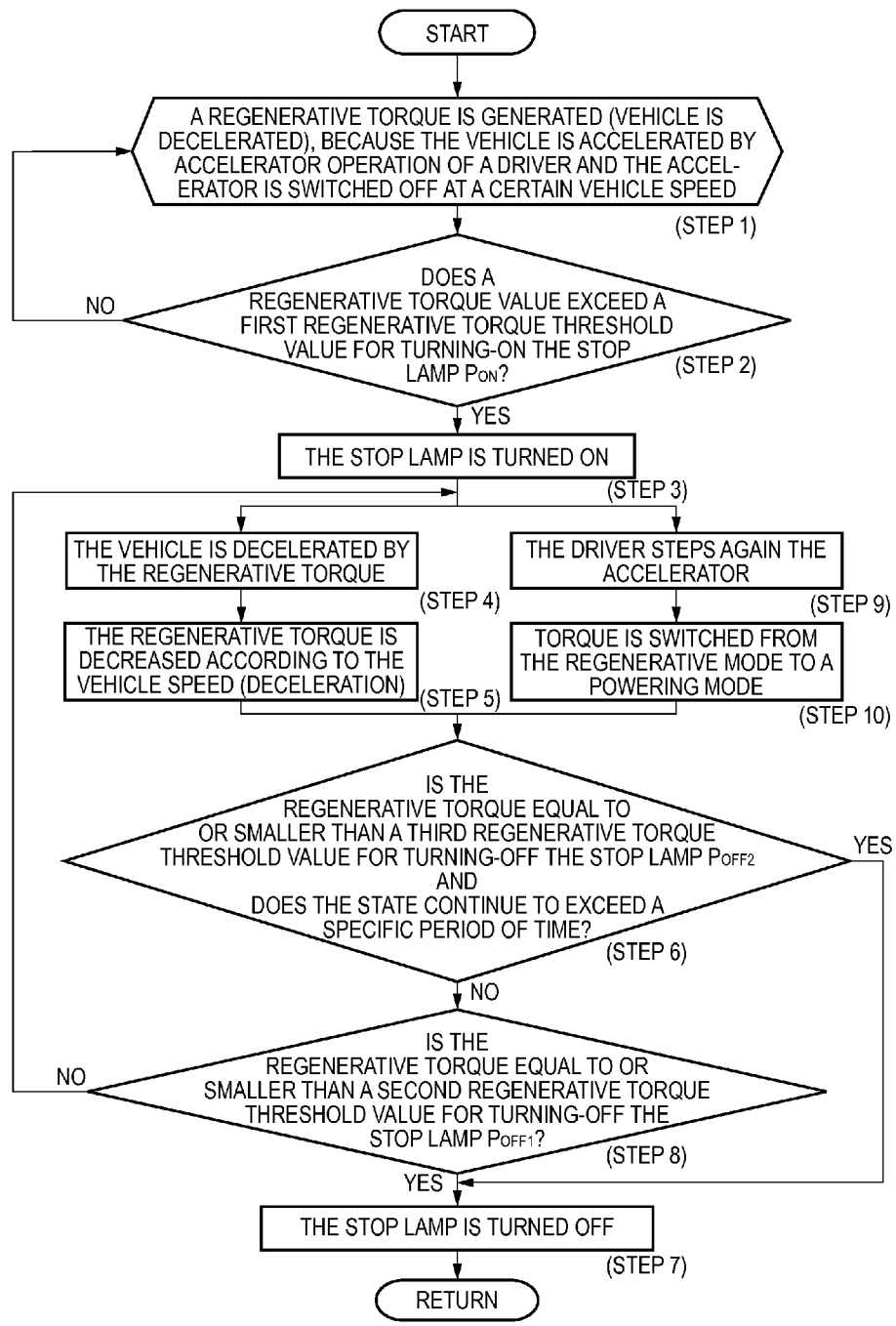
FIG. 2 is a flow chart showing a procedure for controlling the stop lamp lighting control device for the electric vehicle according to the embodiment of the invention.

Next, a control procedure in the determination unit 13 will be described with reference to FIG. 2, which is a flow chart showing the control procedure.

After a vehicle (electric vehicle 1) is accelerated by accelerator operation of a driver, if the accelerator is switched OFF at a certain vehicle speed, the electric regenerative braking system is activated to generate a regenerative torque, and thus the vehicle is decelerated (step 1).

At this time, whether or not the regenerative torque value exceeds the first regenerative torque threshold value for turning-on the stop lamp $P_{ON}$ is determined (step 2). Herein, the first regenerative torque threshold value for turning-on the stop lamp $P_{ON}$ is calculated by converting the first deceleration threshold value for turning-on the stop lamp ($-1.3$ m/s$^2$), assumed that the vehicle weight is a curb weight.

In the step 2, if the regenerative torque value exceeds the first regenerative torque threshold value for turning-on the stop lamp $P_{ON}$, the stop lamp is turned on (step 3).

In the step 3, if the regenerative torque value does not exceed the first regenerative torque threshold value for turning-on the stop lamp $P_{ON}$, the procedure returns to the step 1.

After the step 3, as the electric regenerative braking system is activated to generate a regenerative torque, the vehicle is decelerated (step 4).

As the vehicle is decelerated, the regenerative torque is decreased (step 5).

After the step 5, whether or not a state where the regenerative torque value is equal to or smaller than the third regenerative torque threshold value for turning-off the stop lamp $P_{OFF2}$ continues to exceed the predetermined specific period of time is determined (step 6). If the determination result in the step 6 is true, the stop lamp 3 is turned off (step 7).

If the determination result in the step 6 is false, whether or not the regenerative torque value is smaller than the second regenerative torque threshold value for turning-off the stop lamp $P_{OFF1}$ is determined (step 8). Herein, the second regenerative torque threshold value for turning-off the stop lamp $P_{OFF1}$ is calculated by converting the second deceleration threshold value for turning-off the stop lamp ($-0.7$ m/s$^2$), assumed that the vehicle weight is a gross vehicle weight.

In the step 8, if the regenerative torque value is smaller than the second regenerative torque threshold value for turning-off the stop lamp $P_{OFF1}$, the stop lamp 3 is turned off (step 7).

In the step 8, if the regenerative torque value is not smaller than the second regenerative torque threshold value for turning-off the stop lamp $P_{OFF1}$, the procedure returns to the step 4 or a step 9.

After the step 3, or when the logic of the step 8 is false, if the driver steps again the accelerator (step 9), the torque is switched from the regenerative mode to a powering mode (step 10).

After the step 10, when the procedure proceeds to the determination in the step 6 and also the determination result in the step 6 is false, whether or not the regenerative torque value is smaller than the second regenerative torque threshold value for turning-off the stop lamp $P_{OFF1}$ is determined in the step 8. If the determination in the step 8 is false, the stop lamp 3 is turned off (step 7).

Meanwhile, the present invention is not limited to the foregoing embodiment and accordingly may be variously modified without departing from the scope of the invention.

For example, although in the foregoing embodiment, the second deceleration threshold value for turning-off the stop lamp of $-0.7$ m/s$^2$ and the first deceleration threshold value for turning-on the stop lamp of $-1.3$ m/s$^2$ have been described, the values may be changed depending upon applications thereof.

Also, for example, although in the foregoing embodiment, the third regenerative torque threshold value for turning-off the stop lamp $P_{OFF2}$ has been calculated so that the absolute value of the difference between the first regenerative torque threshold value for turning-on the stop lamp $P_{ON}$ and the third regenerative torque threshold value for turning-off the stop lamp $P_{OFF2}$ is smaller than the absolute value of the difference between the second regenerative torque threshold value for turning-off the stop lamp $P_{OFF1}$ and the third regenerative torque threshold value for turning-off the stop lamp $P_{OFF2}$, the present invention is not limited thereto, and magnitudes of the absolute values of the differences may be changed depending upon applications thereof.

[Industrial Applicability]

The present invention can be applied to turn-on or turn-off control of brake lamps (stop lamps) of electric vehicles, such as hybrid vehicles or plug-in hybrid vehicles having an electric regenerative braking system, in addition to electric vehicles having an electric regenerative braking system.

What is claimed is:

1. A stop lamp lighting control device for an electric vehicle having an electric regenerative braking system, comprising:
   a first calculation unit that converts a previously-defined first deceleration threshold value for turning-on a stop lamp to a first regenerative torque threshold value for turning-on the stop lamp at each vehicle speed by calculation assumed that a weight of the electric vehicle is a curb weight;
   a second calculation unit that converting a previously-defined second deceleration threshold value for turning-off the stop lamp to a second regenerative torque threshold value for turning-off the stop lamp at each vehicle speed by calculation assumed that the weight of the electric vehicle is a gross vehicle weight;

a third calculation unit that calculates, based on the first regenerative torque threshold value and the second regenerative torque threshold value converted, a third regenerative torque threshold value for turning-off the stop lamp which is smaller than the first regenerative torque threshold value and larger than the second regenerative torque threshold value; and a detettnination unit that:
- turns on the stop lamp when a regenerative torque value generated by the electric regenerative braking system during a regenerative braking exceeds the first regenerative torque threshold value corresponding to a vehicle speed at that time;
- turns off the stop lamp when the regenerative torque value is equal to or smaller than the second regenerative torque threshold value corresponding to a vehicle speed at that time; and
- turns off the stop lamp when a state where the regenerative torque value is equal to or smaller than the third regenerative torque threshold value corresponding to a vehicle speed at that time continues to exceed a predetermined specific period of time.

2. The stop lamp lighting control device for an electric vehicle according to claim 1, wherein an absolute value of a difference between the first regenerative torque threshold value and the third regenerative torque threshold value is smaller than an absolute value of a difference between the second regenerative torque threshold value and the third regenerative torque threshold value.

3. The stop lamp lighting control device for an electric vehicle according to claim 1, wherein the determination unit is configured:
- to keep the stop lamp turned on when the regenerative torque value is changed to be equal to or smaller than the first regenerative torque threshold value while the stop lamp is at a turned on state; and
- to keep the stop lamp turned off when the regenerative torque value is changed to exceed the second regenerative torque threshold value while the stop lamp is at a turned off state.

4. The stop lamp lighting control device for an electric vehicle according to claim 1, wherein the specific period of time is varied depending upon the vehicle speed.

5. The stop lamp lighting control device for an electric vehicle according to claim 2, wherein the absolute value of the difference between the first regenerative torque threshold value and the third regenerative torque threshold value is varied depending upon the vehicle speed.

* * * * *